Patented June 30, 1953

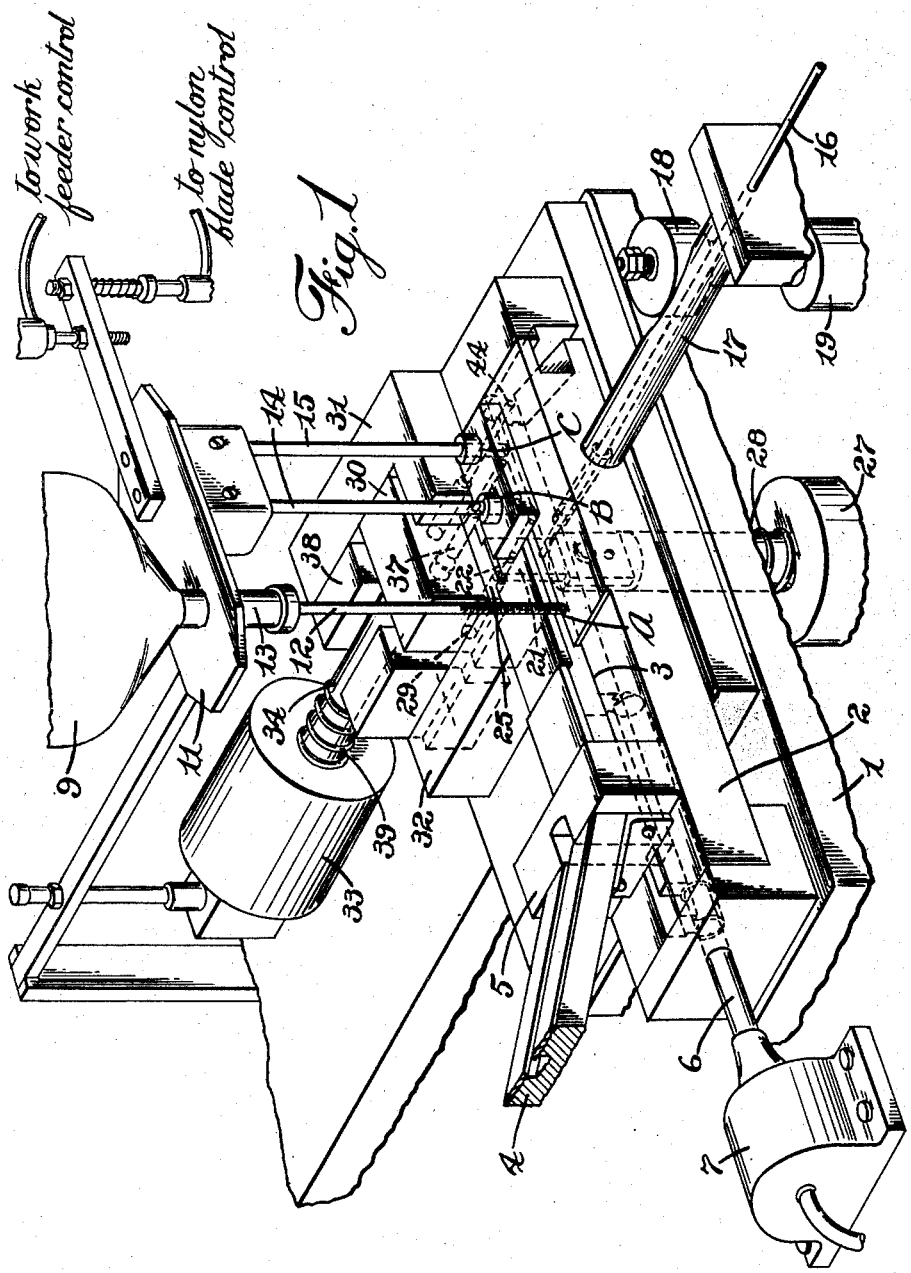
June 30, 1953     J. MacBLANE ET AL     2,643,403
MACHINE FOR MAKING FRICTION GRIP NUTS
Filed Oct. 14, 1949     7 Sheets-Sheet 1
INVENTORS
James MacBlane
Robert N. Paterson
BY
ATTORNEY
WITNESS:

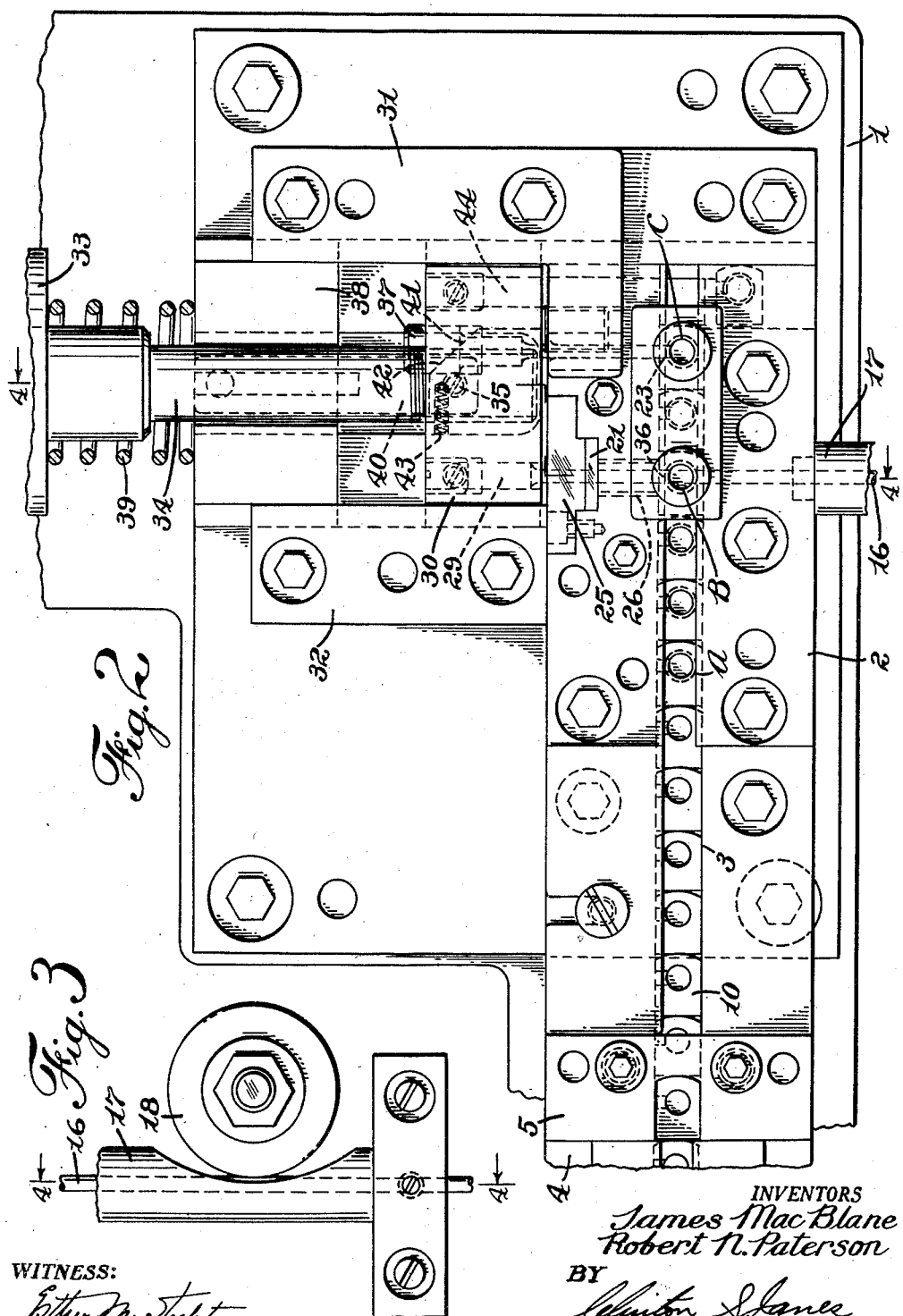

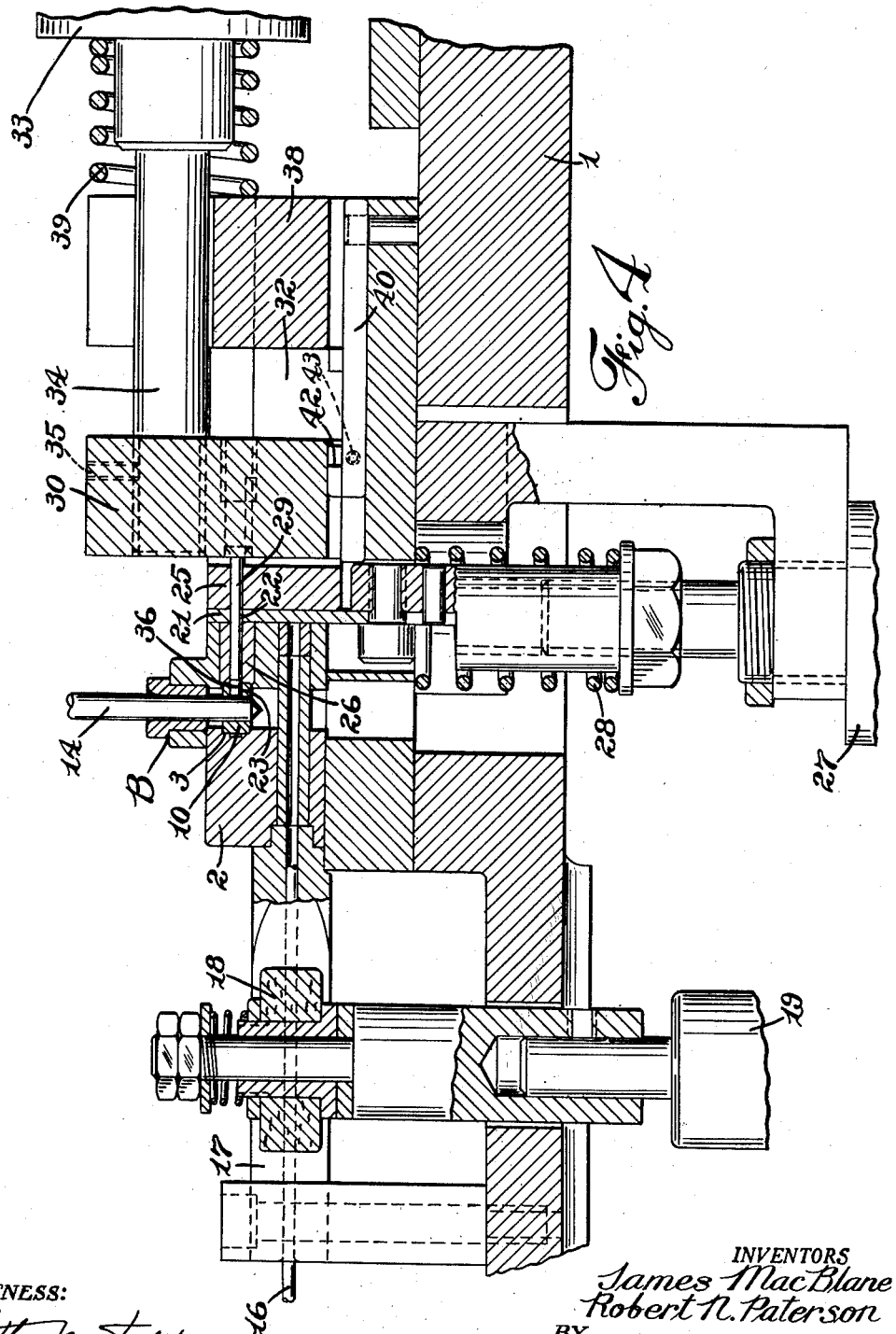

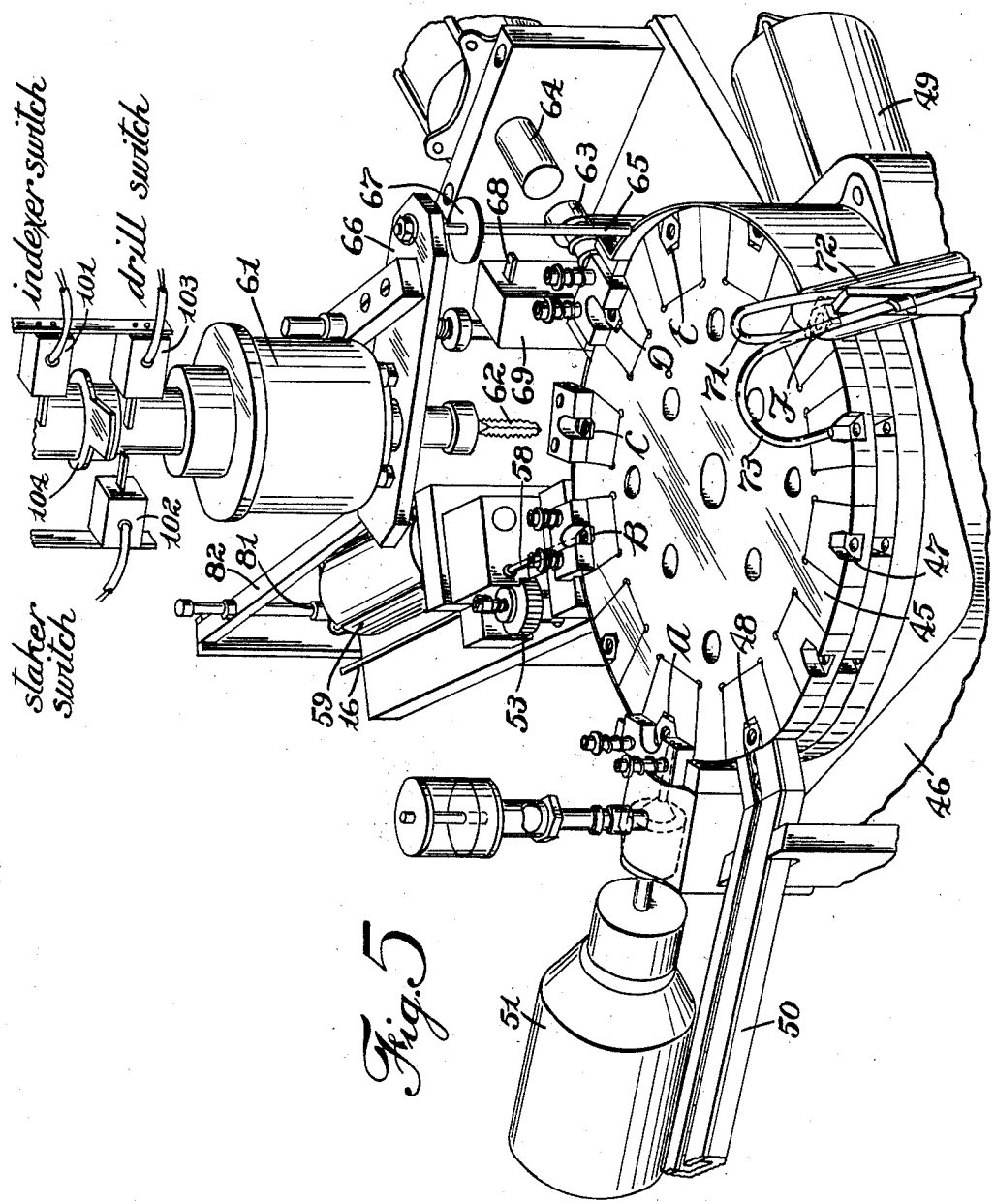

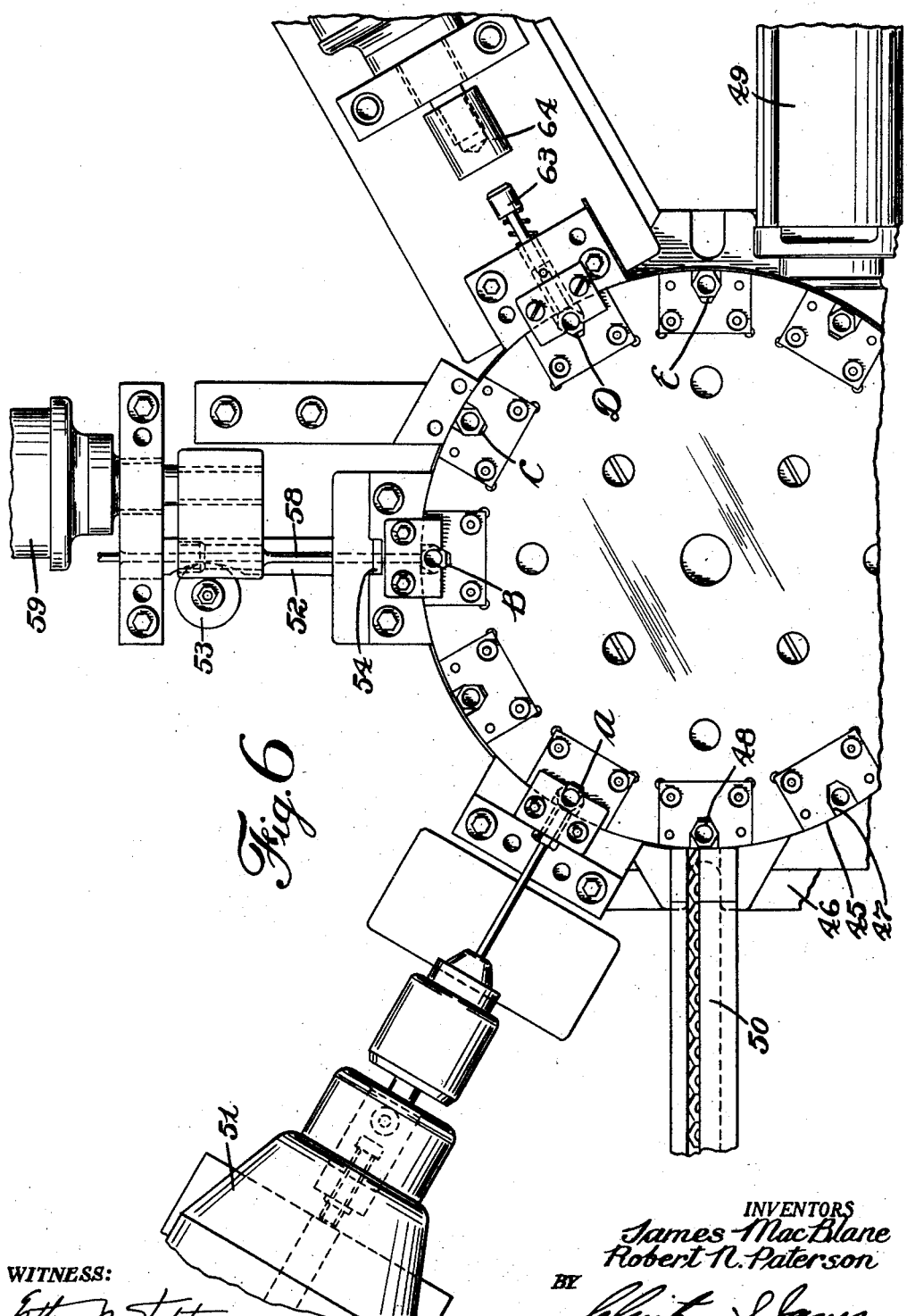

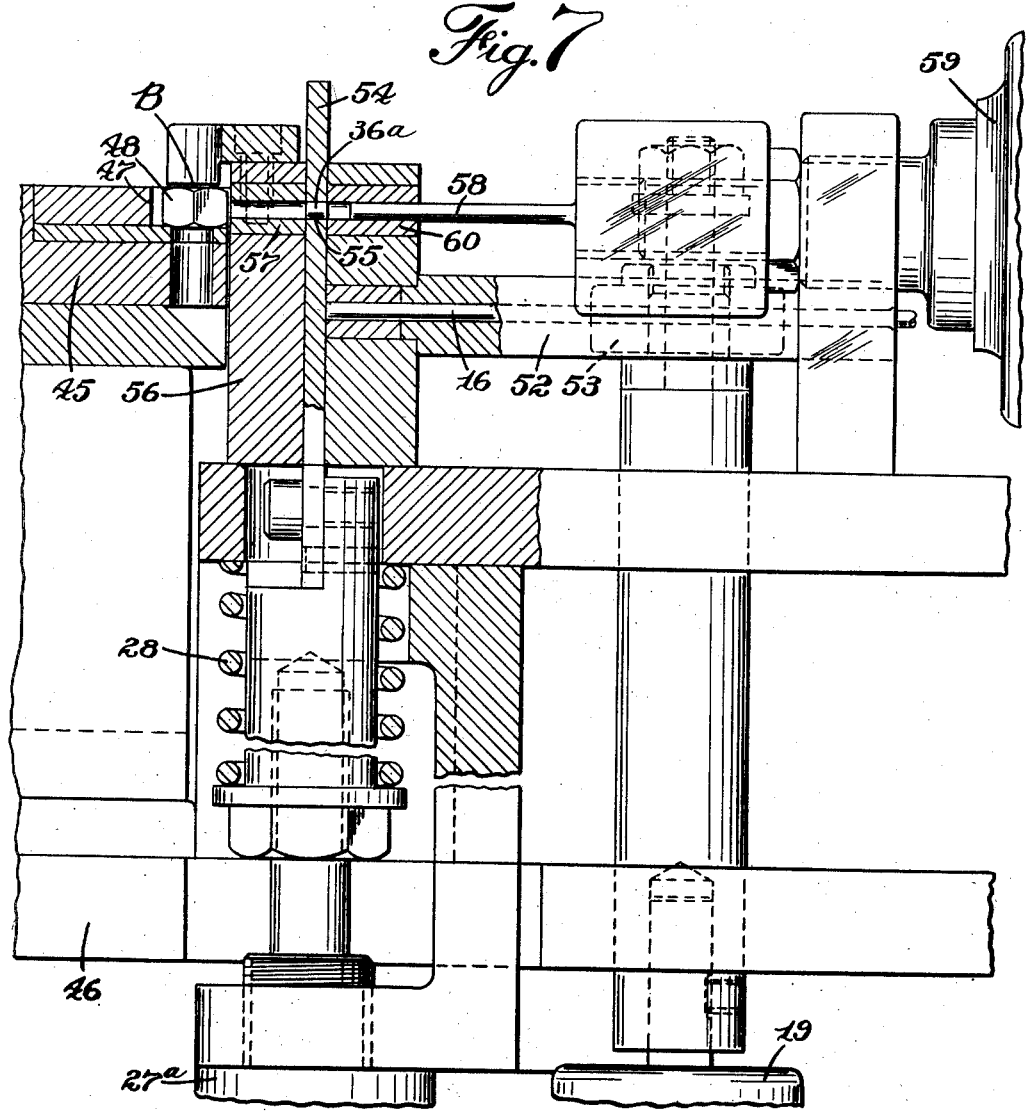

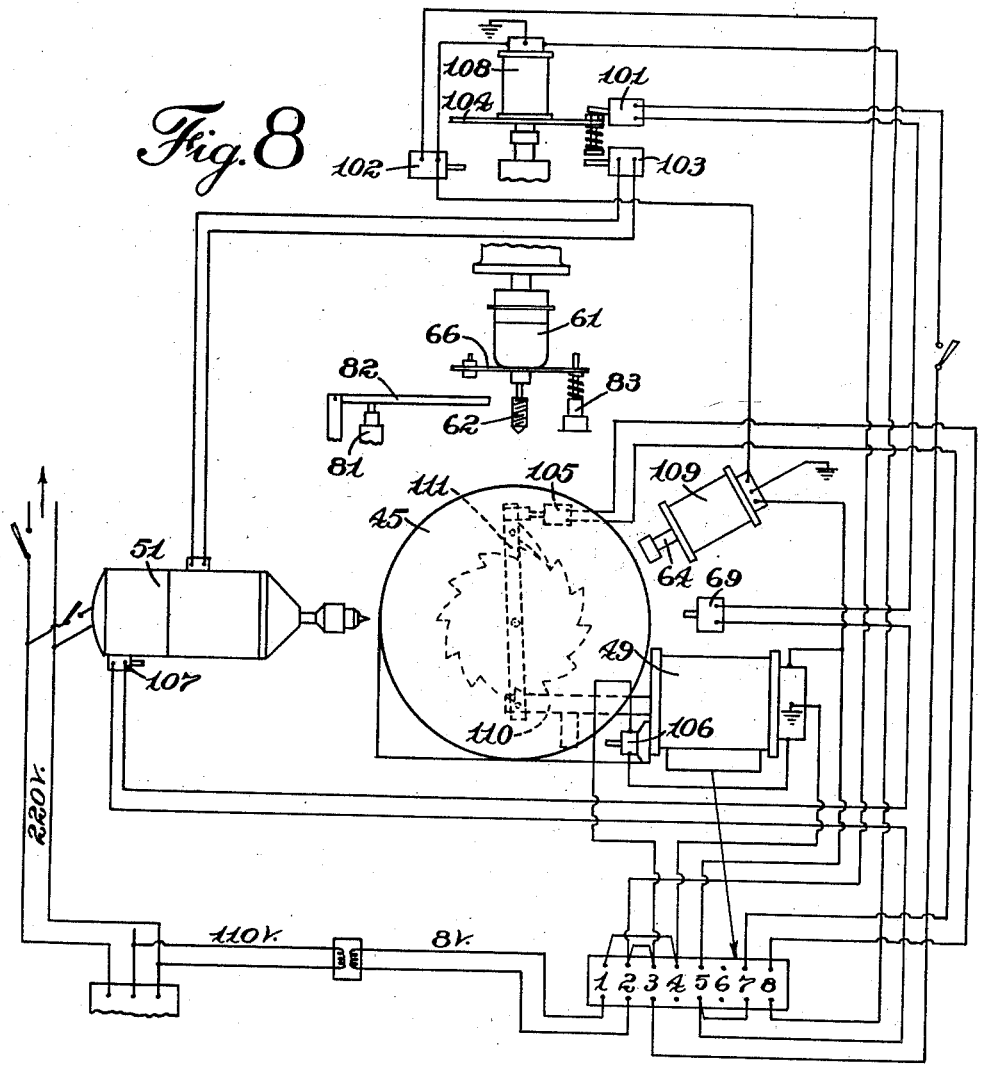

2,643,403

UNITED STATES PATENT OFFICE 2,643,403

MACHINE FOR MAKING FRICTION GRIP NUTS

James MacBlane and Robert N. Paterson, Horseheads, N. Y., assignors, by mesne assignments, to The Nylok Corporation, New York, N. Y., a corporation of Delaware Application October 14, 1949, Serial No. 121,282

20 Claims. (Cl. 10—72)

The present invention relates to a machine for making friction grip nuts, and more particularly to a machine for cutting off and pressing an insert of frictional material through an opening in the side wall of a nut and anchoring the outer end of the insert in the side of the nut.

It is an object of the present invention to provide a novel machine of the above character which is rapid and effective in operation, simple in construction, and uniform in result.

It is another object to provide such a device which includes means for tapping out the interior of the nuts to remove burrs or chips.

It is another object to provide such a device which includes means for drilling the hole through the side-wall of the nut.

It is another object to provide such a device in which the various operations are so interconnected that they follow each other in the desired sequence under the control of a single master timing means.

It is another object to provide such a device in which each operation is separately powered, and the power element which actuates the tapping mechanism is controlled by a repetitive timing device, while all the other power elements are controlled by the actuation of the tapping power element.

It is another object to provide such a device including novel means for stopping the machine if the machine should fail to properly insert the friction material in a nut.

Further objects and advantages will be apparent from the following description taken in connection with the accompanying drawings in which:

Fig. 1 is a perspective view of one preferred embodiment of the invention, the power actuating elements being shown more or less conventionally since they do not constitute inventive subject matter;

Fig. 2 is an enlarged top plan view of the main operating portion of the machine;

Fig. 3 is a detail of the feeding means for the supply of friction material;

Fig. 4 is a vertical sectional view taken on the lines 4—4 of Figs. 2 and 3 showing more particularly the mechanism for cutting off and inserting the frictional material;

Fig. 5 is a detail in perspective of a second embodiment of the invention;

Fig. 6 is an enlarged top plan of the main operating portion of the structure shown in Fig. 5;

Fig. 7 is an enlarged sectional detail of the mechanism for cutting off and inserting the frictional material in the structure illustrated in Fig. 5;

Fig. 8 is a semi-diagrammatic representation of the wiring and control mechanism of the structure illustrated in Fig. 5; and Fig. 9 is a chart showing the sequence of the various operations.

In Fig. 1 of the drawing there is illustrated a machine for manufacturing friction grip nuts generally of the type disclosed in the Boots U. S. Patent 2,462,603, dated February 22, 1949. The machine comprises a base 1 on which is rigidly mounted a work holder and guide member 2 having a rectilinear guide channel 3 along which the work-pieces in the form of nuts to be operated on are arranged to be slid. The guide 3 is of such width as to slidably receive the nuts but prevent any substantial rotation of the nut in the guide. As shown in Fig. 2, the nuts 10 are rectangular in form with one end rounded off, and having a hole through one side wall for the reception of the friction material.

A feeding mechanism, not illustrated since it forms no part of the present invention, introduces the work-pieces in an inclined slide 4 which terminates at and is rigidly fixed to a vertical guide block 5 which is arranged above the starting end of the guide slot 3. Means for moving the nuts along the guide slot in a step-by-step manner is provided in the form of a plunger 6 actuated by a suitable power device 7 which is preferably a compressed air ram so controlled as to actuate the plunger 6 in proper timed relation with the other mechanical elements of the machine.

Three operative stations are located along the guide slot 3, at which stations the three operations of tapping out the interior of the nuts, inserting the frictional material and staking the material in the nut are performed in sequence. At the station indicated by the letter A, a tapping machine 9 is located directly above the nut occupying that station, which machine is arranged to advance a carrier plate 11 and tap 12 downwardly while rotating the tap in a forward direction, and thereafter to reverse the rotation of the tap and withdraw the tap and carrier plate upwardly.

The plate 11 carries a tap holder 13 and dowel rods 14 and 15 which are located over the guide slot 3 and define respectively the second operative position B and the third operative position C in said guide.

At station B there is located the means for cutting off a slug of friction material and inserting it in the opening drilled in the side of the nut. As best shown in Fig. 4, a supply of frictional material 16 in the form of a rod preferably of plastic material such as nylon is entered in a tubular guide member 17 which holds it in frictional engagement with a wheel 18 kept constantly in rotation by a motor 19 in a direction to cause the nylon rod to be urged to the right in Fig. 4. The guide 17 is located below the guide 3 for the workpieces, and a blade 21 having an opening 22 therein is mounted for vertical sliding movement so as to bring its opening 22 alternately into registry with the nylon rod, or with the opening 23 drilled in the side of the nut 10. A back stop 25 provides a guide for the blade 21 and also serves to limit the travel of the nylon rod 16 after it traverses the opening 22 in the blade 21. A bushing 26 having a bore slidably receiving the slug of frictional material is interposed between the blade 21 and the side of the nut 10 to guide the slug into the opening 23 of the nut.

Means for reciprocating the blade 21 is provided, comprising a pneumatic ram 27 for projecting the blade upwardly and a spring 28 for returning the blade to its lower position.

Means is provided for inserting in the hole 23 of the nut the slug of friction material sheared from the end of the rod 16 by the upward movement of the blade 21. For this purpose a punch 29, slightly smaller in diameter than the bore of the hole 22 and bushing 26, is slidably mounted in registry with said bushing and the hole 23 in the nut. Punch 29 is anchored in any suitable manner in a cross-head 30 which is slidably mounted between guides 31 and 32. Cross-head 30 is actuated by a pneumatic ram 33 having a plunger 34 fixed to the cross-head as indicated at 35. The travel of the punch 29 is such that when withdrawn the end of the punch is retracted within the back stop member 25 in which it is guided, and when projected to the end of its stroke the end of the punch is substantially flush with the outer surface of the nut 10, having pressed the slug 36 of friction material into the opening 23 of the nut as shown in Fig. 4. The thickness of the blade 21 is such that the slug 36 sheared off thereby from the friction material 16 is substantially the same length as the thickness of the wall of the nut 10, so that when the slug is inserted in the hole 23 of the nut by the punch 29, it is pressed firmly against the dowel 14 positioning the nut in the guide 3.

The means for staking or clamping the slug 36 of frictional material in the nut at station C is best shown in Fig. 2. As there shown, a staking punch 37 is slidably mounted in the cross-head 30 in registry with the opening 23 of the nut when it occupies the third station. The end of the punch is slightly larger than said opening and the tip may be formed concave or with any other suitable contour to deform the metal of the nut around the opening so as to press it inwardly to firmly clamp the nylon slug in the opening. Means for actuating the punch 37 is provided comprising a hammer block 38 slidably mounted between the guides 31, 32 back of the cross-head 30 and urged toward said cross-head by a compression spring 39. When the cross-head 30 is withdrawn by the pneumatic ram 33, it forces the hammer block 38 back against the spring 39 to the position shown in Fig. 4, where it is held by a pivoted latch member 40. On the subsequent forward movement of the cross-head 30, near the end of its outward stroke, an inclined shoulder 41 thereof cams the nose 42 of the latch member sidewise against the latch spring 43, thus releasing the hammer block 38 and causing it to strike the punch 37 with a blow of substantially uniform force.

The guideway 3 terminates beyond the station C with a lateral opening for discharge of the finished nuts. Means for ejecting the nuts through said opening is provided in the form of a plunger 44 anchored in the cross-head 30 in position to engage and eject the nut at the end of the guide 3.

As indicated in Fig. 1, all the actuating devices 7, 27 and 33 are timed from the automatic tapping head 9 which is timed by any suitable controlling means to cause it to operate at the desired speed. The plate 11 which is reciprocated by the tapping means is used to operate the various levers and plungers which control the pneumatic rams for the various operations.

In the operation of this embodiment, workpiece nuts arriving in the feed guide 4 drop down through the vertical guide 5 into horizontal guide 3 and are advanced step-by-step in said latter guide by the advancing ram 6. When a nut arrives at station A, the automatic tap advances and taps out the interior of the nut, when the nut reaches station B, the blade 21 shears off a slug of friction material 16 and raises it into registry with the hole 23 in the nut, whereupon the punch 29 forces the slug out of the blade 21 into the hole in the nut. The inserting punch 29 is thereupon withdrawn, and when the nut reaches the station C the staking punch 37 is caused to strike the edge of the hole in the nut so as to cause it to clamp the slug of friction material firmly therein. The next step brings the nut into registry with the ejection opening whereupon the punch 44 ejects the finished nut.

The embodiment of the invention illustrated in Figs. 5 to 8 inclusive is intended more particularly to operate on hexagonal work-piece nuts, and includes means for drilling the hole in the side of the nut as a first operation. It is also arranged to tap out the interior of the nut after the insertion of the nylon slug, so as to thread the inner end of the slug and remove the burrs in the threads caused by the drilling of the cross hole.

As shown in Fig. 5, a circular work holder 45 is rotatably mounted on a base 46, and is provided with peripheral sockets 47 equidistantly spaced about the circumference of the work holder, adapted to receive and position a work-piece nut 48 therein, with one of its flat sides arranged tangentially to the work holder. A feed chute 50 conducts the nuts from a hopper, not illustrated, to a socket of the work holder in registry therewith. Means for indexing the work holder through an angle equal to the arcuate distance between contiguous sockets is provided comprising a pneumatic cylinder 49. Since this indexing means is of conventional structure, further description thereof is deemed unnecessary.

Upon actuation of the indexing means 49, the work-piece nut 48 is moved to operative station A at which position an automatic drill 51 of any suitable type is caused to advance, drill a hole in the side of the nut and then withdraw. Further actuation of the indexing means brings the nut to operative station B at which position are located the means for cutting off a slug of the frictional material and inserting it in the hole in the nut.

The inserting means, as shown in Fig. 7, is substantially similar to the corresponding means in the first embodiment of the invention. It comprises a tubular holder and guide 52 for the nylon rod and a constantly rotating friction wheel 53 which advances the nylon into contact with the vertically reciprocating blade 54. This blade is actuated by a pneumatic ram 27ª and is provided with an opening 55 which is brought into registry with the end of the nylon rod at the bottom of the stroke of the blade, whereupon the nylon rod traverses the blade through said opening until stopped by the back-stop 56. Upon the subsequent upward stroke of the blade, a slug of nylon 36ª is sheared off from the end of the rod and conveyed into registry with a tubular guide 57 which registers with the hole in the nut occupying the operative position B.

A punch 58 is actuated by a pneumatic ram 59 and is guided by a bearing member 60 so as to cause it to traverse the opening 55 in the blade 54 and force the nylon slug through the guide 57 into the hole in the work-piece nut 48.

After withdrawal of the punch 58 by the ram 59, the next operation of the indexing means 49 brings the nut to station C where the automatic tapping head indicated generally by numeral 61 (Fig. 5) causes a tap 62 to enter the nut and re-thread the nut and the end of the nylon slug after which the tap reverses and is withdrawn.

The next operation of the indexing means 49 brings the nut to station D where a staking punch 63 is slidably mounted in registry with the hole in the side of the nut and is struck by a pneumatic hammer 64 so as to stake the slug of friction material in the nut.

Means are provided for stopping the machine in case a nut should come through without having received its slug of friction material due to the exhaustion of the supply or for any other reason. As here shown, this means comprises a plunger 65 which is carried by a plate 66 attached to the automatic tapping head 61 with freedom for vertical sliding movement in said plate. The plunger 65 carries a disk 67 fixed thereon which disk is arranged to engage the arm 68 of a sensitive switch 69 if the plunger descends through the full downward stroke of the plate 66 in the tapping operation.

Plunger 65 is arranged in vertical registry over a work-piece nut at a station E beyond the fourth operative station D. Plunger 65 is of such a diameter as to loosely fit the interior of the nut but since the staking operation causes the nylon slug to project slightly into the interior of the nut, the plunger will not traverse the nut if a nylon slug is properly located therein. The downward movement of the plunger 65 is therefore normally arrested by engaging the nylon slug before the disk 67 strikes the arm 68 of the switch 69 so that the switch is not operated and the machine continues to run. In the absence of the nylon slug however the plunger 65 is permitted to traverse the nut at the station E causing the disk 67 to trip the switch 69 and stop the machine.

Further operation of the indexing means 49 brings the nut to the discharge station F where an air blast from a tube 71 starts the nut down the discharge chute 72. A second tube 73 at the next station blows the socket free from any adherent drillings or foreign matter preparatory to the reception of another work-piece nut when it is again brought into registry with the feed chute 50.

In Fig. 8 there is schematically illustrated a combined electrical and mechanical system for controlling all the power devices from the automatic tapping head 61. As there shown, switch 101 actuates the indexing motor 49 to advance the rotatable work holder 45, and also returns the staking hammer 64 to idle position. Switch 102 actuates the drill press cylinder 108 to retract the tap 62, and causes the staking cylinder 109 to actuate its hammer 64. Switch 103 operates the drilling unit 51. Switches 101, 102 and 103 are actuated by a plate member 104 which is actuated by the drill press cylinder 108. Switch 69 stops the machine if there is no nylon in the work-piece at station E as previously described. Switch 105 is arranged to be closed upon completion of the indexing movement of the work holder 45 by means of ratchet lever 111. It controls the actuation of the drill press cylinder 108 to advance the tap 62. Switch 106 is closed by the final retracting movement of the indexing plunger 110. It causes reactuation of the cylinder 49 to index the work holder 45. Switch 107 on the drill motor 51 is arranged to prevent operation of the machine until the drilling unit has returned to idle position.

Plate 66 carried by the tapping head 61 is arranged to actuate a plunger 83 which controls the valve for the nylon shearing ram 27ª. It is arranged to open the valve during the first part of the downward movement of the tapping head. The nylon inserting ram 59 at station B is operated by a pneumatic valve 81 actuated by a lever 82 (Fig. 5) which is engaged by the final downward movement of the plate 66.

The machine cycle is started by closure of switch 101, which returns the work holder indexing cylinder 49 to idle position and thereby causes closure of switch 106, which actuates said cylinder to index the work holder. Upon completion of the indexing movement, switch 105 is contacted to close it, which causes the drill press cylinder 108 to advance the tap 62, at the same time closing the switch 103 which actuates the drilling unit 51. At the end of the stroke of the drill press, switch 102 is contacted by plate 104, causing the return of the drill press cylinder 108, and actuating the staking cylinder 109.

The downward movement of the plate 66 by the tapping head 61 first actuates the ram 27ª for the nylon shearing mechanism, and then operates lever 82 which controls cylinder 59 for inserting the nylon slug in the work.

On the return stroke of the drill press, plate 104 again closes switch 101 to repeat the cycle of operation.

The drilling unit, after being brought into operation by switch 103, automatically advances, drilling the hole in the side of the work-piece, and then withdraws, closing switch 107 when it returns to idle position. Switch 107 thus prevents premature operation of the indexing means before the drill is withdrawn.

Recapitulating the operation of this embodiment, the workpiece nut 48 after entering a socket 47 in the rotatable work holder 45 is brought in sequence to station A where a hole is drilled in its side, to station B where a nylon slug is inserted, to station C where the nut is tapped and the inner end of the slug is threaded, and to station D where the outer end of the nylon slug is staked into the hole of the nut. If the nylon slug is properly positioned by the staking means, when the nut reaches station E it prevents the plunger 65 from stopping the machine, after which the nut proceeds to station F where it is discharged.

Although certain embodiments of the invention have been shown and described in detail, it will be understood that other embodiments are possible and that changes may be made in the design of the parts and the sequence of operations without departing from the scope of the invention.

What is claimed is:

1. In a machine for making friction grip nuts, means for simultaneously positioning a series of nuts in a plurality of operative stations in sequence; means at one station for severing a slug from an elongated rod of frictional material and inserting said slug through a hole in the side of a nut so as to project into the interior of the nut, means at another station for tapping the interior of the nut, means at another station for swaging the outer edge of said hole to stake the slug therein and cause it to project into the bore of the nut, means for periodically actuating the tapping means, and means for controlling all the other operations in timed relation to the tapping means.

2. A machine for making friction grip nuts as set forth in claim 1 in which the means for severing and inserting the frictional material includes movable means to receive the end of said rod and shear off a slug of proper length from the end of the rod, said movable means being movable to align the slug with the hole in the nut, and means for forcing the slug out of the movable means into said hole.

3. In a machine for making friction grip nuts, means for simultaneously positioning a series of nuts in a plurality of operating stations in sequence; means at one station for inserting a slug of frictional material through a hole in the side of a nut so as to project into the interior of the nut, the last-mentioned means including a blade member having a thickness equal to the length of the slug and having a hole therethrough slightly larger than the diameter of the slug, means for passing the end of a rod of friction material into said hole, means for then moving the blade member laterally to shear off the slug and position it in alignment with the hole in the nut, and means including a punch for forcing the slug out of the blade member and into the hole in the nut; means at another station for tapping the interior of the nut; means at another station for staking the outer end of said hole to stake the slug therein and cause it to project into the bore of the nut; means for periodically actuating the tapping means; and means for controlling all the other operations in timed relation to the tapping means.

4. A machine for making friction grip nuts as set forth in claim 1 in which the swaging means includes a staking punch, slidably located in alinement with the hole in the nut at the swaging station, yielding means for holding the punch retracted and means including a hammer for striking the punch with a substantially uniform impact.

5. A machine for making friction grip nuts as set forth in claim 1 including further, separate motive means for the slug inserting means, the tapping means, the staking means, and the work positioning means; means including a timer for causing the tapping means to advance the tap into the nut while rotating forwardly, then to reverse and retract the tap; and connections from the tapping means for controlling all the other motive means in timed relation thereto.

6. A machine for making friction grip nuts as set forth in claim 1 including further, a plunger member movable into said nut to detect the presence and absence of a slug in said nut, and means responsive to failure of said member to detect a slug in said nut for stopping the machine.

7. In a device for inserting friction gripping material into threaded nuts, a turntable having a plurality of work-holding and positioning receptacles equally spaced about its periphery, a work-feeding device located opposite one of said receptacles, means for indexing the turntable to bring the receptacles in sequence opposite the feeder to receive a work-piece therefrom, a drilling device located at a first operative position opposite a receptacle which has received a work-piece, and operative to drill a hole through the side of the nut, means opposite a receptacle at a second operative position for inserting a slug of friction material in said hole so that it projects slightly into the bore of the nut, means opposite a receptacle at a third operative position for tapping out the bore of the nut and cutting threads in the end of the slug of friction material, means opposite a receptacle in a fourth operative position for staking the outer end of the slug in the side wall of the nut and causing the slug to project slightly into the bore of the nut, and means for alternately operating the indexing means and the drilling, inserting, tapping and staking means.

8. A device as set forth in claim 7 in which said operating means includes timing means for controlling the insertion and withdrawal of the tap from the bore of the nut, and means actuated by the movement of the tapping means for controlling the actuation of the indexing, drilling, inserting and staking means.

9. A device as set forth in claim 7 including further, an inspection device comprising a plunger located opposite a receptacle at a station subsequent to the fourth operative station, designed and arranged to enter and have a sliding fit in the bore of the nut at that station, means for yieldingly inserting the plunger in the nut, and means for stopping the machine responsive to unimpeded passage of the plunger through the nut.

10. In a device for introducing friction gripping material into threaded nuts, a circular rotary work holder having receptacles equally spaced about its periphery arranged to hold a nut with its bore parallel to the axis of the work holder, and one of its flat sides tangential to the work holder; a feeding device adjacent the periphery of the work holder arranged to introduce a work-piece in each receptacle as it comes into juxtaposition therewith, means for indexing the work holder to bring the receptacles in sequence opposite the feeding device, an automatic drilling unit located opposite a receptacle at a first operative station and arranged to drill a hole through the flat side of the nut, means located opposite a receptacle at a second operative position arranged to sever a slug of friction material from a rod thereof having substantially the diameter of said hole, and of a length approximately equal to the thickness of the wall of the nut, and inserting said slug in the hole so as to project slightly into the bore of the nut; means located opposite a receptacle at a third operative position for rotating and introducing a tap into the bore of the nut to remove burrs and thread the inner end of the friction material and then reversing and withdrawing the tap; means located opposite a receptacle at a fourth operative position for deforming the outer edge of the hole in the nut to cause it to seize and stake the friction material so as to hold it with its inner end projecting slightly into the bore of the nut, and means for alternately actuating the indexing means, and then the four operative means, while the work holder is held stationary.

11. A device as set forth in claim 10 including further, guard means located between each of the operative stations for holding the nuts in the receptacles.

12. A device as set forth in claim 10 in which the actuating means includes a timing device for controlling the insertion and retraction of the tap, means responsive to the advance of the tapping means for actuating the drilling unit at the first operative station, the severing and slug inserting means at the second operative station, and the staking means at the fourth operative position; and means responsive to the retraction of the tapping means to actuate the indexing means.

13. A device as set forth in claim 10 in which the severing and inserting means comprises a supply holder having an opening substantially radial to the axis of the work holder slidably receiving a rod of friction material, a blade of rectangular cross-section having a similar opening, mounted in a guide for sliding movement parallel to the axis of the work holder, means for reciprocating the blade to bring the opening therein alternatively into registry with the opening in the supply holder or the hole in the side of the nut in the work holder, means constantly pressing the rod of friction material toward the blade to cause it to enter the opening in the blade when in registry therewith, a punch slidably mounted in alinement with the hole in the side of the nut, and means operative when the blade has moved its opening with a severed slug of friction material into registry with the hole in the nut, to project the punch through the opening in the blade and force the slug into the hole in the nut.

14. In a device for inserting friction gripping material into threaded nuts, a turntable having a plurality of work-holding and positioning receptacles equally spaced about its periphery, a work-feeding device located opposite one of said receptacles, means for indexing the turntable to bring the receptacles in sequence opposite the device to receive a work-piece therefrom, a drilling device spaced from said work feeding device and located at a position opposite a receptacle which has received a work-piece, and operative to drill a hole through the side of the nut, means opposite a receptacle at another position spaced from said drilling device and work-feeding device for inserting a slug of friction material in said hole so that it projects slightly into the bore of the nut, means spaced from said slug inserting means and opposite a receptacle for tapping out the bore of the nut, means spaced from said tapping means and opposite a receptacle for staking the outer end of the slug in the side wall of the nut and causing the slug to project slightly into the bore of the nut, and means for alternately operating the indexing means and the drilling, inserting, tapping and staking means.

15. An apparatus for manufacturing lock nuts comprising a rotatable work-supporting table, means to rotate said table intermittently, a plurality of fixtures mounted on said table to receive nut blanks having center openings therein with the axes of said openings perpendicular to the work table, drill means adjacent to said work table and movable substantially radially thereof to drill a hole transversely through a wall of each nut blank, tapping means movable toward and away from said table to tap the center opening of each nut, means adjacent said work table to insert a resilient plug into the hole in each nut, a staking punch adjacent said table to stake each nut around the outer end of the hole therein to secure the plug in said hole, and means to operate said drilling means, said tapping means, said plug inserting means and said staking punch in timed relation to the intermittent movement of said table.

16. An apparatus for manufacturing lock nuts comprising a rotatable work-supporting table, means to rotate said table intermittently, a plurality of fixtures mounted on said table to receive nut blanks having center openings therein with the axes of said openings perpendicular to the work table, drill means adjacent to said work table and movable substantially radially thereof to drill a hole transversely through a wall of each nut blank, means adjacent said work table to insert a resilient plug into the hole in each nut, staking means adjacent said table to stake each nut around the outer end of the hole therein to secure the plug in said hole, and means to operate said drilling means, said plug inserting means and said staking means in timed relation to the intermittent movement of said table.

17. An apparatus for manufacturing lock nuts comprising a rotatable work-supporting table, means to rotate asid table intermittently, a plurality of fixtures mounted on said table to receive nut blanks having center openings therein with the axes of said openings perpendicular to the work table, drill means adjacent to said work table and movable substantially radially thereof to drill a hole transversely through a wall of each nut blank, means adjacent said work table to sever a section from an elongated piece of resilient material to form a resilient plug and insert said plug into the hole in each nut, staking means adjacent said table to stake each nut around the outer end of the hole therein to secure the plug in said hole, and means to operate said drilling means, said plug severing and inserting means and said staking means in timed relation to the intermittent movement of said table.

18. An apparatus for manufacturing lock nuts comprising a rotatable work-supporting table, means to rotate said table intermittently, a plurality of fixtures mounted on said table to receive nut blanks having center openings therein with the axes of said openings perpendicular to the work table, drill means adjacent to said work table and movable substantially radially thereof to drill a hole transversely through a wall of each nut blank, means adjacent said work table to insert a resilient plug into the hole in each nut, a fluid actuated punch adjacent said table to stake each nut around the outer end of the hole therein to secure the plug in said hole, and means to operate said drilling means, said plug inserting means and said punch in timed relation to the intermittent movement of said table.

19. In a machine for making friction grip threaded members, the combination of a movable work support having receptacles thereon to receive a plurality of work pieces, feeding means adjacent to said work support to supply work pieces to said receptacles, drilling means adjacent to said work support and spaced from said feeding means to drill a hole in the side of each work piece in a receptacle, means spaced from said drilling means and adjacent to said work support to cut slugs from a rod of friction material and insert them in said holes in said work pieces with an end of each slug projecting from each hole, threading means adjacent to said work support for threading said work pieces, and means for moving said work support and actuating said drilling means, said slug cutting and inserting means and said threading means in timed relation.

20. In a machine for making friction grip threaded members, the combination of a movable work support having receptacles thereon to receive a plurality of work pieces, feeding means adjacent to said work support to supply work pieces to said receptacles, drilling means adjacent to said work support and spaced from said feeding means to drill a hole in the side of each work piece in a receptacle, a movable shearing member having an opening to receive the end of an elongated rod of friction material, said member being adjacent to said work support and spaced from said drilling means and movable to shear off the end of said rod to form a slug of predetermined length, plunger means to force the slug out of the opening into a hole in a work piece, threading means adjacent to said work support for threading said work pieces, and means for moving said work support and actuating said drilling means, said movable shearing member, said plunger means and said threading means in timed relation to each other.

JAMES MacBLANE.
ROBERT N. PATERSON.

References Cited in the file of this patent

UNITED STATES PATENTS

| Number | Name | Date |
|---|---|---|
| 771,752 | Stafford | Oct. 4, 1904 |
| 1,428,175 | Luther | Sept. 5, 1922 |
| 1,988,096 | Tilsher | Jan. 15, 1935 |
| 2,217,715 | Swanstrom | Oct. 15, 1940 |
| 2,436,858 | Eisele | Mar. 2, 1948 |
| 2,462,603 | Boots | Feb. 22, 1949 |